United States Patent
Van Steenwyk et al.

(10) Patent No.: US 10,287,872 B2
(45) Date of Patent: May 14, 2019

(54) INERTIAL CAROUSEL POSITIONING

(71) Applicant: Scientific Drilling International, Inc., Houston, TX (US)

(72) Inventors: Brett Van Steenwyk, Paso Robles, CA (US); Benjamin C. Hawkinson, Paso Robles, CA (US); Brian D. Gleason, Atascadero, CA (US); Timothy P. Whitacre, Paso Robles, CA (US); Matthew A. White, Templeton, CA (US)

(73) Assignee: SCIENTIFIC DRILLING INTERNATIONAL, INC., Houston, TX (US)

( * ) Notice: Subject to any disclaimer, the term of this patent is extended or adjusted under 35 U.S.C. 154(b) by 503 days.

(21) Appl. No.: 14/946,505

(22) Filed: Nov. 19, 2015

(65) Prior Publication Data

US 2016/0177704 A1    Jun. 23, 2016

Related U.S. Application Data

(60) Provisional application No. 62/081,944, filed on Nov. 19, 2014.

(51) Int. Cl.
*E21B 47/024* (2006.01)
*G01C 25/00* (2006.01)

(52) U.S. Cl.
CPC ............ *E21B 47/024* (2013.01); *G01C 25/00* (2013.01)

(58) Field of Classification Search
CPC .............................. E21B 47/024; G01C 25/00
See application file for complete search history.

(56) References Cited

U.S. PATENT DOCUMENTS 3,691,363 A    9/1972   Armistead
4,013,945 A    3/1977   Grosso
(Continued)

FOREIGN PATENT DOCUMENTS

WO    2013102237 A2    7/2013

OTHER PUBLICATIONS

Prikhodko, Igor P. et al.; "What is MEMS Gyrocompassing? Comparative Analysis of Maytagging and Carouseling"; Journal of Microelectromechanical Systems, 2013 (10 pages).
(Continued)

*Primary Examiner* — Matthew R Buck
*Assistant Examiner* — Aaron L Lembo
(74) *Attorney, Agent, or Firm* — Adolph Locklar (57) ABSTRACT

A steering tool may include a tool body, gimbal body rotatably coupled to the tool body, and an angular positioning device to rotate the gimbal body relative to the tool body. One or more sensors may be coupled to the gimbal body. The sensors may be one or more gyros, accelerometers, and magnetometers. A gyro may be aligned with the axis of rotation of the gimbal body and may be used to detect rotation of the gimbal body. The detected rotation may be used to stabilize the gimbal body by using the angular positioning device. A gimbal toolface angle relative to a reference frame may be determined based on readings of one or more of the sensors. The gimbal body may be rotated to align with a reference position by the angular positioning device and rotated to one or more other gimbal toolface angles, at which sensor readings may be taken.

47 Claims, 3 Drawing Sheets

(56) References Cited

U.S. PATENT DOCUMENTS

| | | | |
|---|---|---|---|
| 4,071,959 A | | 2/1978 | Russell et al. |
| 4,199,869 A | | 4/1980 | Van Steenwyk |
| 4,245,498 A | | 1/1981 | Poquette, Jr. |
| 4,454,756 A | * | 6/1984 | Sharp .................. E21B 47/022 33/313 |
| 4,461,088 A | | 7/1984 | Van Steenwyk |
| 4,461,089 A | | 7/1984 | Krogmann |
| 4,530,237 A | * | 7/1985 | Barriac ................. G01C 21/16 73/178 R |
| 4,537,067 A | * | 8/1985 | Sharp .................. E21B 47/022 374/136 |
| 4,696,112 A | | 9/1987 | Hoffman |
| 4,756,088 A | * | 7/1988 | Russell ................. E21B 47/022 33/312 |
| 4,987,684 A | | 1/1991 | Andreas et al. |
| 5,039,944 A | | 8/1991 | Kim et al. |
| 5,970,787 A | | 10/1999 | Wignall |
| 6,895,678 B2 | | 5/2005 | Ash et al. |
| 6,918,186 B2 | | 7/2005 | Ash et al. |
| 6,966,211 B2 | * | 11/2005 | Wu ....................... E21B 47/022 73/1.75 |
| 7,065,449 B2 | | 6/2006 | Brewster et al. |
| 7,093,370 B2 | | 8/2006 | Hansberry et al. |
| 7,650,269 B2 | | 1/2010 | Rodney |
| 8,065,087 B2 | | 11/2011 | Ekseth et al. |
| 8,528,381 B2 | | 9/2013 | Rodney et al. |
| 2003/0056381 A1 | * | 3/2003 | Brosnahan ............ E21B 47/022 33/313 |
| 2003/0220743 A1 | | 11/2003 | Van Steenwyk et al. |
| 2005/0126022 A1 | | 6/2005 | Hansberry et al. |
| 2007/0242042 A1 | | 10/2007 | Kelly |
| 2008/0230273 A1 | | 9/2008 | Brooks |
| 2012/0173196 A1 | | 7/2012 | Miszewski et al. |
| 2012/0218118 A1 | * | 8/2012 | Weston .................. E21B 19/00 340/853.8 |
| 2014/0007646 A1 | | 1/2014 | Rodney et al. |
| 2014/0366622 A1 | * | 12/2014 | Goetze .................. E21B 47/022 73/152.59 |
| 2015/0052988 A1 | * | 2/2015 | Price .................... E21B 47/024 73/152.17 |
| 2016/0145997 A1 | * | 5/2016 | Van Steenwyk ...... E21B 47/022 33/302 |

OTHER PUBLICATIONS

Digital Surveying; "How it Works"; HSHA Rate Gyro; Digital Surveying PTY Ltd; 2012 (1 page) Retrieved from: http://www.digitalsurveying.co.za/technical-specs/hsha-rate-gyro/how-it-works/.

IFG Corporation; "BGO-02 Gyro Borehole Orientation Probe"; IFG Corp.; 2012 (2 pages) Retrieved from: http://www.ifgcorp.com/products/borehole-probes/bgo-02-gyro-borehole-orientation-probe.phtml.

International Search Report and Written Opinion issued in PCT App. No. PCT/US2015/061659 dated Mar. 17, 2016 (21 pages).

* cited by examiner

INERTIAL CAROUSEL POSITIONING

CROSS-REFERENCE TO RELATED APPLICATIONS

The present application claims priority from U.S. Provisional Patent Application No. 62/081,944, filed on Nov. 19, 2014, the entirety of which is incorporated herein by reference.

TECHNICAL FIELD/FIELD OF THE DISCLOSURE

The present disclosure relates generally to borehole surveying systems, and specifically to compensation systems for borehole surveying systems.

BACKGROUND OF THE DISCLOSURE

In a wellbore survey in a drillpipe, especially during steering or measure while drilling, a drillpipe could have, in a long horizontal section, significant residual torsion. Residual torsion, as well as other forces on the drill pipe such as rotation during drilling, can lead to rotation of this drillpipe while acquiring survey data. In certain wireline surveys, the surveying tool may rotate about the axis of the wireline. Gyroscopic, magnetic, or accelerometer readings made during surveying may be affected by such rotation, which can affect the accuracy of the survey.

SUMMARY

The present disclosure provides for a method. The method may include positioning a steering tool in a wellbore. The steering tool may include a tool body and a gimbal body. The gimbal body may be rotatably coupled to the tool body. The steering tool may also include an angular positioning device. The angular positioning device may be coupled to the gimbal body to rotate the gimbal body relative to the tool body about a gimbal body axis of rotation. The steering tool may include a gyro coupled to the gimbal body having a sensitive axis substantially aligned with the gimbal body axis of rotation. The method may include measuring a change in angular rate of rotation of the gimbal body with the gyro to determine a rotation of the gimbal body. The method may include stabilizing the gimbal body with the angular positioning device to oppose the measured change in angular rate of rotation of the gimbal body.

The present disclosure also provides for a method. The method may include positioning a steering tool in a wellbore. The steering tool may include a tool body and a gimbal body. The gimbal body may be rotatably coupled to the tool body. The steering tool may also include an angular positioning device. The angular positioning device may be coupled to the gimbal body to rotate the gimbal body relative to the tool body about a gimbal body axis of rotation. The steering tool may include a sensor coupled to the gimbal body. The method may include determining a reference frame. The method may include determining a gimbal toolface angle with respect to the reference frame with the sensor.

The present disclosure also provides for a method. The method may include positioning a steering tool in a wellbore. The steering tool may include a tool body and a gimbal body. The gimbal body may be rotatably coupled to the tool body. The steering tool may also include an angular positioning device. The angular positioning device may be coupled to the gimbal body to rotate the gimbal body relative to the tool body about a gimbal body axis of rotation. The steering tool may include a gyro coupled to the gimbal body having a sensitive axis substantially aligned with the gimbal body axis of rotation. The steering tool may include one or more sensors coupled to the gimbal body. The method may include preventing rotation between the gimbal body and the tool body. The method may include taking measurements with the at least one sensor. The method may include determining that the gimbal body has not rotated during the sensor measurements for a preselected sample period by measuring a change in angular rate of rotation of the gimbal body with the gyro. The method may include using the sensor measurements to determine one or more of orientation of the steering tool or error, bias, or mass unbalance of the sensor or gyro.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As used herein, a reference frame is a pre-defined coordinate system. The reference frame may be based on a terrestrial frame defined with respect to a field vector, such as a gravity vector, magnetic field vector, or Earth rotation vector. In other embodiments, a reference frame may be inertial, where an orientation in free space is the reference frame.

As used herein, gimbal toolface angle is the angle of the gimbal body measured in a plane perpendicular to the gimbal body axis of rotation measured with respect to the longitudinal axis of a tool body, the earth's magnetic field, the earth's gravity field, the earth's rotation vector, or a preselected reference point on the tool body.

Certain embodiments of the present disclosure are directed to a system and method for correcting one or more of gyroscopic, magnetic, and accelerometer surveying readings for rotation of the tool body. In these embodiments, during gyroscopic surveying, rotation of the tool body may be measured and then compensated for mathematically, by rotating a gimbal, or by a combination thereof.

Figure 1:
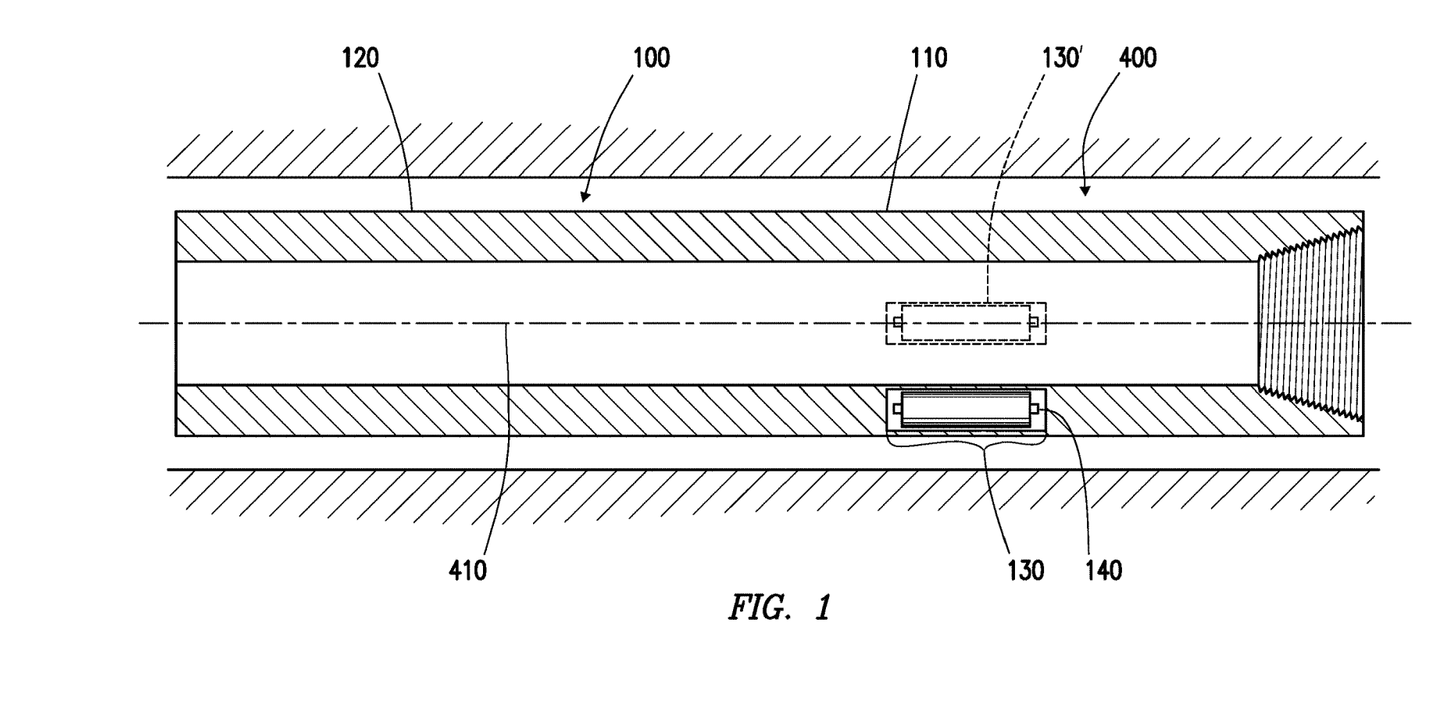
FIG. 1 is a side view of a steering tool of an inertial carousel positioning system consistent with at least one embodiment of the present disclosure.

FIG. 1 is a side view of a steering tool of an inertial carousel positioning system consistent with at least one embodiment of the present disclosure. Inertial carousel positioning system 100 includes steering tool 110. Steering tool 110 may be located within drill string 400, with drill string 400 having drill string longitudinal axis 410. Steering tool 110 includes tool body 120. Also depicted in FIG. 1 is gimbal 130. Gimbal 130 is located within tool body 120. Gimbal 130 includes gimbal body 140. Although depicted as positioned in a tubular tool body 120, one having ordinary skill in the art with the benefit of this disclosure will understand that gimbal 130 may be positionable in any downhole tool or other structure without deviating from the scope of this disclosure. For example and without limitation, gimbal 130', as depicted in FIG. 1, may be positioned separately from and within tool body 120. For the purposes of this disclosure, longitudinal axis 410 of drill string 400 is defined as extending in a direction substantially parallel to a wellbore at the position of inertial carousel positioning system 100.

Figure 3:
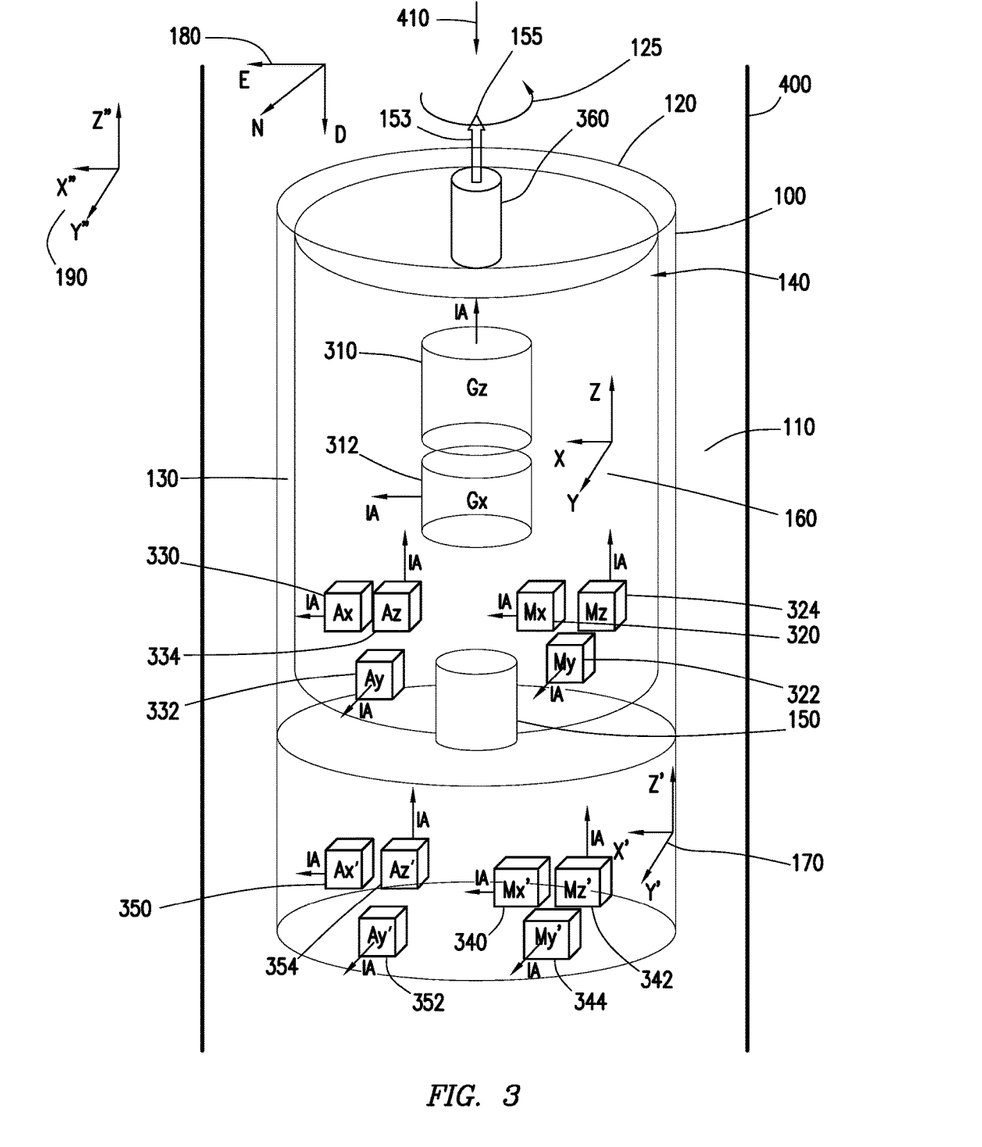
FIG. 3 a schematic representation of inertial carousel positioning system consistent with at least one embodiment of the present disclosure.

FIG. 3 a schematic representation of inertial carousel positioning system 100 consistent with at least one embodiment of the present disclosure. As shown in FIG. 3, inertial carousel positioning system 100 may be located within drill string 400. In other embodiments, inertial body positioning system 100 may be located within casing. Drill string 400 has drill string longitudinal axis 410. Inertial body positioning system 100 may include steering tool 110. Steering tool 110 includes tool body 120. Inertial carousel positioning system 100 further includes gimbal 130 located within tool body 120. Gimbal 130 includes gimbal body 140. Gimbal 130 may be rotationally coupled to tool body 110 such that gimbal body 140 may rotate about gimbal body axis of rotation 153. Gimbal body axis of rotation 153 is nominally parallel to drill string longitudinal axis 410.

Gimbal body coordinate frame 160 is shown in FIG. 3. For purposes of this disclosure, gimbal body coordinate frame 160 is defined as a three axis coordinate frame, with the Z axis parallel to gimbal body axis of rotation 153, and the X and Y axes of gimbal body coordinate frame 160 being cross-axis to drill string longitudinal axis 410, i.e., orthogonal to each other and with respect to the Z axis. Gimbal toolface angle 125 is further depicted in FIG. 3. Gimbal toolface angle is measured in a plane perpendicular to the Z-axis of gimbal body coordinate frame 160.

With further attention to FIG. 3, tool body coordinate frame 170 is shown. For purposes of this disclosure, tool body coordinate frame 170 is defined as a three axis coordinate frame, with the Z' axis nominally parallel to gimbal body axis of rotation 153, and the X' and Y' axes of tool body coordinate frame 170 being cross-axis to drill string axis 410, i.e., orthogonal to each other and with respect to the Z' axis.

FIG. 3 also depicts terrestrial reference frame 180. For purposes of this disclosure, terrestrial reference frame 180 is defined by an East (E) axis, a North (N) axis, and a Down (D) axis.

FIG. 3 further depicts inertial reference frame 190. Inertial coordinate frame 190 is fixed in space, i.e, the earth rotates with respect to this frame. For purposes of this disclosure, inertial reference frame 190 is defined as a three axis coordinate frame, with the Z" axis nominally parallel to drill string longitudinal axis 410, and the X and Y axes of inertial reference frame 190 being cross-axis to the drill string longitudinal axis 410, i.e., orthogonal to each other and with respect to the Z axis.

As further shown in FIG. 3, inertial carousel positioning system 100 further includes angular positioning device 150 mechanically coupled to gimbal body 140 and, in certain embodiments, mechanically coupled to tool body 120. Angular positioning device 150 may generate torque about gimbal body axis of rotation 153, causing gimbal body 130 to rotate about gimbal body axis of rotation 153. Angular positioning device 150 may be a torque motor, stepper motor, brushless motor, brushed motor, geared motor, piezoelectric motor, rotary actuator, linear actuator, hydraulic actuator, pneumatic actuator, or combinations thereof.

In some embodiments, one or more gyroscopes may be mounted to gimbal body 140. In certain embodiments, such as the embodiment depicted in FIG. 3, gyroscope Gz 310 may be mounted on gimbal body 140 and oriented such that the input axis of gyroscope Gz 310 is parallel to the Z axis of gimbal body coordinate frame 160. In some embodiments, such as the embodiment depicted in FIG. 3, a second gyroscope, gyroscope Gx 312, may be mounted on gimbal body 140 and oriented such that the input axis of Gx 312 is parallel to the X axis of gimbal body coordinate frame 160. In certain embodiments, Gz 310 and Gx 312 are single axis gyroscopes. In other embodiments, Gz 310 and Gx 312 are components of a multi-axis gyroscope such as a two or three axis gyroscope. In some embodiments, either Gz 310 or Gx 312 may be omitted, i.e., only one gyroscope is mounted to gimbal body 140. As described herein below, the one or more gyroscopes may be used to determine one or more components of the earth spin vector.

In some embodiments, one or more magnetometers may be mounted to gimbal body 140. In certain embodiments, such as the embodiment depicted in FIG. 3, magnetometer Mx 320 may be mounted on gimbal body 140 and oriented such that the input axis of magnetometer Mx 320 is parallel to the X axis of gimbal body coordinate frame 160. In some embodiments, such as the embodiment depicted in FIG. 3, a second magnetometer, My 322, may be mounted on gimbal body 140 and oriented such that the input axis of My 322 is parallel to the Y axis of gimbal body coordinate frame 160. In yet other embodiments, such as the embodiment depicted in FIG. 3, a third magnetometer, Mz 324, may be mounted on gimbal body 140 and oriented such the input axis of Mz 324 is parallel to the Z axis of gimbal coordinate frame 160. In certain embodiments, Mx 320, My 322, and Mz 324 are single axis magnetometers. In other embodiments, Mx 320, My 322, and Mz 324 are components of one or more multi-axis magnetometers, such as a two or three axis magnetometer. In some embodiments, any one or two of Mx 320, My 322, and Mz 324 may be omitted, i.e., only one or two magnetometers are mounted to gimbal body 140. As described herein below, the one or more magnetometers may be used to determine one or more components of local magnetic field.

In some embodiments, one or more accelerometers may be mounted to gimbal body 140. In certain embodiments, such as the embodiment depicted in FIG. 3, accelerometer Ax 330 may be mounted on gimbal body 140 and oriented such that the input axis of accelerometer Ax 330 is parallel to the X axis of gimbal body coordinate frame 160. In some embodiments, such as the embodiment depicted in FIG. 3, a second accelerometer, Ay 332, may be mounted on gimbal body 140 and oriented such that the input axis of Ay 322 is parallel to the Y axis of gimbal body coordinate frame 160. In yet other embodiments, such as the embodiment depicted in FIG. 3, a third accelerometer, Az 334, may be mounted on gimbal body 140 and oriented such the input axis of Az 334 is parallel to the Z axis of gimbal coordinate frame 160. In certain embodiments, Ax 330, Ay 332, and Az 334 are single axis accelerometers. In other embodiments, Ax 330, Ay 332, and Az 334 are components of one or more multi-axis accelerometers, such as a two or three axis accelerometer. In some embodiments, any one or two of Ax 330, Ay 332, and Az 334 may be omitted, i.e., only one or two accelerometers are mounted to gimbal body 140. As described herein below, the one or more accelerometers may be used to determine one or more components of local gravity field.

In certain embodiments, one or more sensors may be mounted to tool body 120. For instance, as shown in FIG. 3, one or more magnetometers may be mounted to tool body 120. In certain embodiments, such as the embodiment depicted in FIG. 3, magnetometer Mx' 340 may be mounted on tool body 140 and oriented such that the input axis of magnetometer Mx' 320 is parallel to the X' axis of tool body coordinate frame 170. In some embodiments, such as the embodiment depicted in FIG. 3, a second magnetometer, My' 342, may be mounted on tool body 120 and oriented such that the input axis of My' 342 is parallel to the Y' axis of tool body coordinate frame 170. In yet other embodiments, such as the embodiment depicted in FIG. 3, a third magnetometer, Mz' 344, may be mounted on tool body 120 and oriented such the input axis of Mz' 344 is parallel to the Z' axis of tool body coordinate frame 170. In certain embodiments, Mx' 340, My' 342, and Mz' 344 are single axis magnetometers. In other embodiments, Mx' 340, My' 342, and Mz' 344 are components of one or more multi-axis magnetometers, such as a two or three axis magnetometer. In some embodiments, any one or two of Mx' 340, My' 342, and Mz' 344 may be omitted, i.e., only one or two magnetometers are mounted to tool body 120. As described herein below, the one or more magnetometers may be used to determine one or more components of local magnetic field.

In some embodiments, one or more accelerometers may be mounted to tool body 120. In certain embodiments, such as the embodiment depicted in FIG. 3, accelerometer Ax' 350 may be mounted on tool body 120 and oriented such that the input axis of accelerometer Ax' 350 is parallel to the X' axis of tool body coordinate frame 170. In some embodiments, such as the embodiment depicted in FIG. 3, a second accelerometer, Ay' 352, may be mounted on gimbal body 140 and oriented such that the input axis of Ay' 352 is parallel to the Y' axis of tool body coordinate frame 170. In yet other embodiments, such as the embodiment depicted in FIG. 3, a third accelerometer, Az' 354, may be mounted on tool body 120 and oriented such the input axis of Az' 354 is parallel to the Z' axis of tool body coordinate frame 170. In certain embodiments, Ax' 350, Ay' 352, and Az' 354 are single axis accelerometers. In other embodiments, Ax' 350, Ay' 352, and Az' 354 are components of one or more multi-axis accelerometers, such as a two or three axis accelerometer. In some embodiments, any one or two of Ax' 350, Ay' 352, and Az' 354 may be omitted, i.e., only one or two accelerometers are mounted to tool body 120. As described herein below, the one or more accelerometers may be used to determine one or more components of local gravity field.

In certain embodiments, such as that shown in FIG. 3, inertial carousel positioning system 100 includes angular position measuring device 360. In some embodiments, angular position measuring device 360 may be coupled between gimbal 130 and tool body 120. Angular position measuring device 360 may measure the relative rotation between gimbal 130 and tool body 120. One having ordinary skill in the art with the benefit of this disclosure will understand that the specific depiction of angular positioning device 150 and angular position measuring device 360 in the accompanying figures is merely exemplary and is not intended to limit the scope of this disclosure. For example, in some embodiments, angular position measuring device 360 may be located within or as a part of angular positioning device 150. In other embodiments, one or both of angular positioning device 150 and angular position measuring device 360 may be positioned away from gimbal body axis of rotation 153, and one or more axles (not shown) may couple gimbal 130 to tool body 120. Angular positioning measuring device 360 may be any device capable of measuring the relative rotation between gimbal 130 and tool body 120, and may include, for example and without limitation, a resolver, optical encoder, capacitive encoder, magnetic encoder, rotary potentiometer, rotary variable differential transformer, synchro, or combinations thereof. In some embodiments, wherein angular positioning device 150 is a stepper motor, the relative rotation between gimbal 130 and tool body 120 may be determined at least in part by counting the number of steps taken by the stepper motor. One having ordinary skill in the art with the benefit of this disclosure will understand that additional mechanisms, including, for example and without limitation, bearings, gear boxes, etc. may be used without deviating from the scope of this disclosure.

As described above, performing survey using a gyroscope, tool body 120 may rotate due to drill string torque release, wireline torque release, or drilling. Traditionally, tool body 120 was assumed stationary with respect to rotation during surveying using a gyroscope and angular position measuring device 360 was used to determine the change in angle of gimbal 130 with respect to terrestrial reference frame 180. When tool body 120 rotates, however, angular position measuring device 360 may not accurately indicate the change in angle of gimbal 130 with respect to terrestrial reference frame 180. Inertial carousel positioning system 100 may be used to correct for tool body rotation.

In certain embodiments of the present disclosure, inertial carousel positioning system 100 may be used to determine the initial angular position of gimbal body 130 with respect to tool body 120 based on a reference frame or a combination of reference frames. The rotation of tool body 120 may then be calculated with respect to gravity, a magnetic reference, inertial space, or a combination thereof. In addition, in certain embodiments, determination of the rotational change of gimbal body 130 may be made with respect to one or more reference frames.

In some embodiments of the present disclosure, inertial carousel positioning system 100 may include "carouselling" gimbal 130. In carouselling, gimbal 130 may be rotated, using, for instance, angular positioning device 150 between two or more gimbal toolface angles relative to a reference frame. In certain embodiments, the rotation of gimbal 130 through a series of gimbal toolface angles is accomplished without change in tool body 120 rotational orientation. As gimbal 130 is rotated about gimbal body axis of rotation 153, sensors mounted on gimbal 130 or gimbal 130 and tool body 120, including, without limitation, one or more of Gz 310, Gx 312, Mx 320, My 322, Mz 324, Ax 330, Ay 332, Az 334, Mx' 340, My' 342, Mz' 344, Ax' 350, Ay' 352, and Az' 354 are sampled, generating "carouselling data." In certain embodiments, gimbal 130 is rotated at a constant speed about gimbal body axis of rotation 153 and the sensors are sampled during such rotation. In other embodiments, gimbal 130 may be rotated, stopped at a pre-determined gimbal toolface angle and sensors sampled, and then rotated to a next pre-determined gimbal toolface angle, stopped, and sensors sampled. In yet other embodiments, rather than stopping the gimbal at one or more pre-determined gimbal toolface angle, the gimbal rotation may be slowed at the one or more gimbal toolface angles, for instance, to 1°/second or between 0.1°/second and 10°/second and the sensor sampled. In certain embodiments, during carouselling, gimbal 130 may be rotated through at least one complete revolution. In other embodiments, during carouselling, gimbal 130 may be rotated through less than a complete revolution. In some embodiments, gimbal 130 may be capable of rotation through a full revolution or only a subset of a full revolution without deviating from the scope of this disclosure.

The carouselling data may then be processed to determine and correct bias error on the sensors sampled and/or unbalance error with respect to gyroscopes, for example and without limitation, Gx 312 and Gz 310. As one of ordinary skill in the art will appreciate with the benefit of this disclosure, "bias error" is error that affects the accuracy of sensors and may be caused by inherent inaccuracies of the sensor or by external fields, including, but not limited to magnetic and gravity fields. Mass unbalance error of a gyro may be caused by acceleration, such as gravity, acting on uneven mass distribution in a gyroscope.

In some embodiments, carouselling may be used to determine sensor bias for sensors with an input axis perpendicular to that of gimbal body axis of rotation 153, such as, for instance, Mx 320, My 322, Ax 330, and Ay 332, or approximately perpendicular, such as Mx' 340, My' 344, Ax' 350, and Ay' 352. Although intended to be merely exemplary and without limiting the present disclosure, in some embodiments, sensor bias may be determined as discussed in one or more of U.S. Pat. Nos. 4,686,771; 4,461,089; or Igor P. Prikhodko, et. al., *What is MEMS Gyrocompassing? Comparative Analysis of Maytagging and Carouseling*, 22 J. of Microelectromechanical Systems 1257 (2013); each of which is hereby incorporated by reference in its entirety.

Figure 2A:
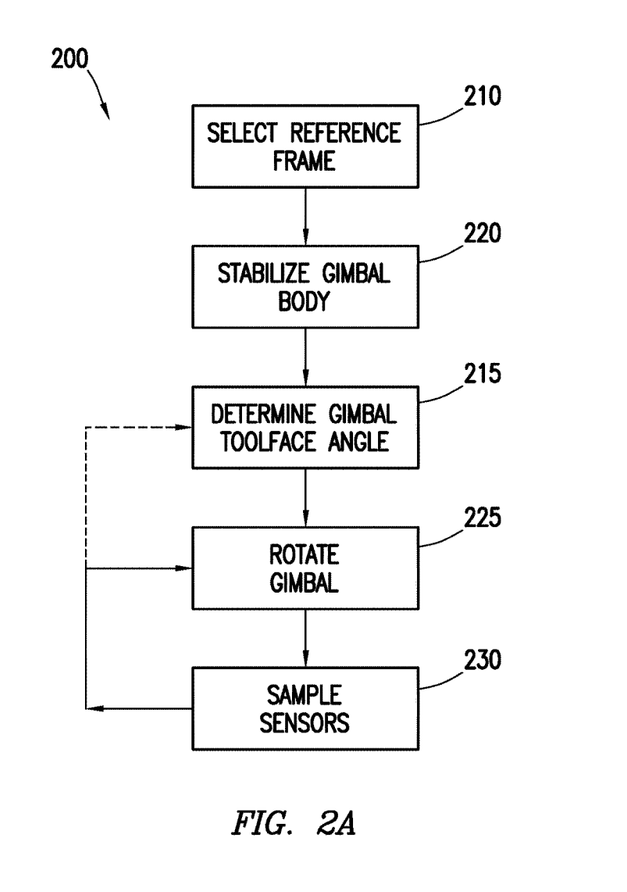
FIG. 2A is a flow chart of an inertial carousel positioning method consistent with at least one embodiment of the present disclosure.

FIG. 2A is a flow chart of inertial carousel positioning method 200 consistent with at least one embodiment of the present disclosure. A reference frame is selected in select reference frame 210. In some embodiments, the reference frame may be the inertial reference frame. In the embodiment shown in 2A, gimbal body 140 may be "stabilized" in stabilize gimbal body 220. "Stabilize" refers to maintaining gimbal 130 stationary with respect to a reference frame such that despite rotation of tool body 120, gimbal 130 remains substantially stationary with respect to the reference frame. As one of ordinary skill in the art will recognize with the benefit of this disclosure, certain control systems may result in small amount (less than 0.1°) of rotation of gimbal 130 with respect to the reference frame. These small amounts of rotation may then be corrected by the control system. "Stationary" encompasses this small amount of rotation. Stabilize gimbal body 220 may be accomplished by for instance, sampling Gz to determine if rotation of gimbal body 140 about gimbal body axis of rotation 153 is occurring. In some embodiments, a control system (not shown) may instruct angular positioning device 150 to oppose the measured rotation, thereby holding gimbal body 140 stationary with respect to the selected reference frame. In some embodiments, without binding at least one embodiment of the present disclosure to theory, the control system may utilize one or more error signals measured by one or more sensors coupled to gimbal body 140 in a closed loop control system to maintain gimbal body 140 stationary with respect to the selected reference frame. In some embodiments, for example and without limitation, the error signal may be a change in angular rotation rate of gimbal body 140 detected by gyroscope Gz 310, or a measurement by one or more accelerometers, magnetometers, or other sensors coupled to gimbal body 140. In some embodiments, the control system may sample the error signals generally continuously and output a generally continuous control signal to angular positioning device 150. In other embodiments, the control system may intermittently control angular positioning device 150 to correct for rotation of gimbal body 140. In some embodiments, the control system may have a predetermined refresh rate. One having ordinary skill in the art with the benefit of this disclosure will understand that any control algorithm may be utilized to control angular positioning device 150 to stabilize gimbal body 140 without deviating from the scope of this disclosure, and additional sources of feedback from sensors described herein or otherwise may be utilized to stabilize gimbal body 140.

Thereafter, the gimbal toolface angle is determined in determine gimbal toolface angle 215 by sampling one or more sensors mounted on gimbal body 140. In some embodiments, the gimbal toolface angle may be determined with respect to the terrestrial reference frame. In some embodiments, the gimbal toolface angle may be determined with respect to a magnetic toolface or gravity toolface.

With further reference to FIG. 2A, gimbal 130 may be carouselled, as described above, in rotate gimbal 225 and sample sensors 230 to at least a second gimbal toolface angle. One or more sensors may be utilized to detect, determine, or measure the second gimbal toolface angle, or, when gimbal body 140 is rotated continuously during measurements, detect, determine, or measure the gimbal toolface angle at the position of each sensor reading. During rotate gimbal 225 and sample sensors 230, gimbal body 140 may continue to be stabilized as described with respect to stabilize gimbal body 220 when in each position, as it is rotated, or both. As understood by one having ordinary skill in the art with the benefit of this disclosure, the closed loop control system may utilize the measured error signal from, for example and without limitation, gyro Gz 310, to modulate the commanded signal to angular positioning device 150 to stabilize gimbal body 140 during rotation or when stationary. Thus, gimbal body 140 may remain stabilized with respect to the reference frame, i.e., gimbal body 140 is rotated at a commanded rotation rate with respect to the reference frame despite rotation of tool body 120. In some embodiments, sensor readings may include measurements from any gyros, accelerometers, and magnetometers included on gimbal body 140, and may be used to calculate one or more of gimbal azimuth, inclination, gyro toolface, gravity toolface, and magnetic toolface. In some embodiments, sensor bias and error terms, including drift and mass unbalance, may be likewise calculated. In some embodiments, by measuring the relative rotation between gimbal body 140 and tool body 120, for example and without limitation, by angular position measuring device 360, azimuth, inclination, gyro toolface, gravity toolface, and magnetic toolface of tool body 120 may be determined.

In some embodiments, after determine gimbal toolface angle 215, the control system may rotate gimbal body 140 to a predetermined gimbal toolface angle 215, referred to herein as a reference position of gimbal body 140. In some embodiments, the reference position of gimbal body 140 may correspond to the selected reference frame. For example, and without limitation, the reference position of gimbal body 140 may position one or more sensors positioned therein with a particular orientation relative to the selected reference frame. For example and without limitation, the sensitive axis of gyroscope Gx 312 as described herein above may be aligned with an axis of or a planar projection of an axis, such as Down, of terrestrial reference frame 180. In some embodiments, the reference position may be selected based on the outputs of one or more accelerometers or magnetometers. For example, and without limitation, the reference position may be selected such that accelerometer Ax 330 measures no acceleration and accelerometer Ay 332 reads a positive acceleration, i.e. the sensitive axis of accelerometer Ax 330 is substantially aligned with a horizontal plane with respect to gravity and the sensitive axis of accelerometer Ay 332 is pointing above the horizontal plane. In some embodiments, for example and without limitation, the reference position may be selected such that magnetometer Mx 320 measures no magnetic field and magnetometer My 322 reads a positive magnetic field, i.e. the sensitive axis of magnetometer Mx 320 is aligned substantially orthogonal to the magnetic field and the sensitive axis of magnetometer My 322 is in the same general direction of the magnetic field. Once positioned in the reference position, sensors may be sampled, and stabilize gimbal body 220, rotate gimbal 225, and sample sensors 230 may operate as previously described. In such an embodiment, sensing operations at different wellbore locations may each include measurements in substantially the same positions with respect to the selected reference frame. In some embodiments, the gimbal toolface angles to which rotate gimbal 225 rotates gimbal body 140 may be predetermined. For example, in some embodiments, gimbal body 140 may be rotated from a position in which accelerometer Ax 330 reads no acceleration and accelerometer Ay 332 reads positive acceleration, to a position in which Ax 330 reads no acceleration and accelerometer Ay 332 reads negative acceleration, or to a position in which accelerometer Ay 332 reads no acceleration and accelerometer Ax 330 reads positive acceleration or negative acceleration. One having ordinary skill in the art with the benefit of this disclosure will understand that similar orientations may be determined with respect to magnetometers 320, 322 or any other sensors without deviating from the scope of this disclosure. In some embodiments, stabilize gimbal body 220 may retain gimbal body 140 stationary with respect to the selected reference frame as drill string 400 is moved within the wellbore, such as, for example and without limitation, during a drilling operation.

Figure 2B:
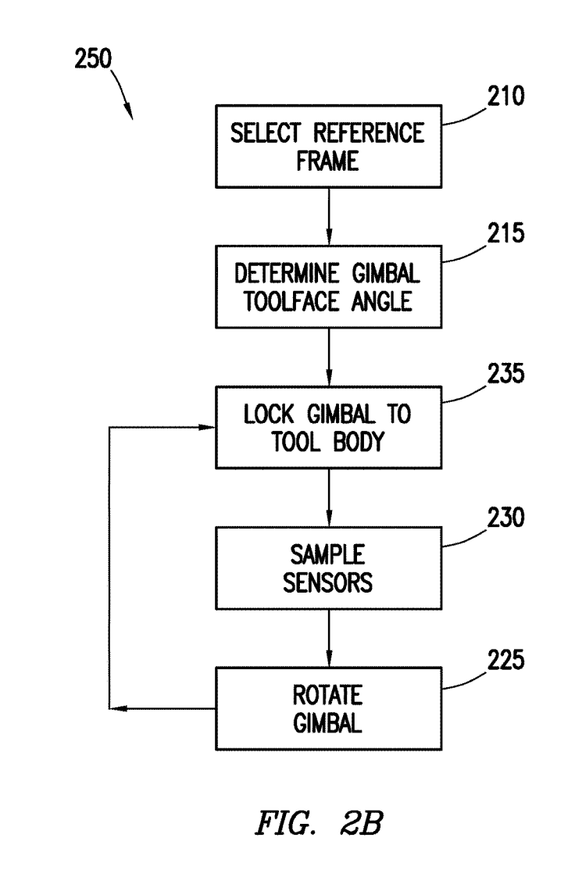
FIG. 2B is a flow chart of an inertial carousel positioning method consistent with at least one embodiment of the present disclosure.

FIG. 2B is a flow chart of inertial carousel positioning method 250 consistent with at least one embodiment of the present disclosure. A reference frame is selected in select reference frame 210. Thereafter, the gimbal toolface angle is determined in determine gimbal toolface angle 215 by sampling one or more sensors mounted on gimbal body 140. In some such embodiments, the relative orientation between gimbal body 140 and tool body 120 may be maintained, referred to herein as lock gimbal to tool body 235. In some embodiments, gimbal body 140 may be locked to tool body 120 by angular positioning device 150 or one or more brakes or locking mechanisms (not shown). In some embodiments, the gimbal toolface angle may be determined with respect to the terrestrial reference frame by sampling any sensors coupled thereto at sample sensors 230. In some embodiments, one or more accelerometers may be used to determine the gimbal toolface angle with respect to gravity. In some embodiments, one or more magnetometers may be utilized to determine the gimbal toolface angle with respect to the magnetic field. In some embodiments, two or more gyros may be utilized to determine the gimbal toolface angle with respect to the Earth rotation vector. In some embodiments, the sensors may also detect any change of gimbal toolface angle with respect to the selected reference frame while gimbal body 140 is locked to tool body 120. In some embodiments, sensor readings may be taken for a preselected sample period during which no change in gimbal toolface angle is measured. In some embodiments, gimbal body 140 may be rotated at rotate gimbal 225 to a second angular position with respect to the selected reference frame. Lock gimbal to tool body 235, sample sensors 230, and rotate gimbal 225 may be repeated a desired number of iterations. In some embodiments, sensor readings may include measurements from any gyros, accelerometers, and magnetometers included on gimbal body 140 or tool body 120, and may be used to calculate one or more of gimbal azimuth, inclination, gyro toolface, gravity toolface, and magnetic toolface. In some embodiments, sensor bias and error terms, including drift and mass unbalance, may be likewise calculated. In some embodiments, by measuring the relative rotation between gimbal body 140 and tool body 120, for example and without limitation, by angular position measuring device 360, azimuth, inclination, gyro toolface, gravity toolface, and magnetic toolface of tool body 120 may be determined.

Although described separately, in some embodiments, the methods described with respect to embodiments depicted in FIGS. 2A and 2B may be combined or alternated between without deviating from the scope of this disclosure.

In some embodiments, additional gimbals may be utilized as described herein and as described in U.S. patent application Ser. No. 14/946,394, filed Nov. 19, 2015, titled "Tumble Gyro Surveyor" to Brett van Steenwyk and Tim Whitacre.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method comprising:
providing a steering tool on a drill string, the steering tool including:
 a tool body;
 a gimbal body, the gimbal body rotatably coupled to the tool body;
 an angular positioning device, the angular positioning device coupled to the gimbal body to rotate the gimbal body relative to the tool body about a gimbal body axis of rotation; and
 a gyro coupled to the gimbal body having a sensitive axis substantially aligned with the gimbal body axis of rotation;
positioning the steering tool and drill string in a wellbore;
moving the steering tool, which steers the drill string, within the wellbore;

measuring a change in angular rate of rotation of the gimbal body with the gyro to determine a rotation of the gimbal body; and stabilizing the gimbal body with the angular positioning device to oppose the measured change in angular rate of rotation of the gimbal body.

2. The method of claim 1, further comprising;
determining a reference frame; and
determining a gimbal toolface angle with respect to the reference frame;
wherein the stabilizing operation maintains the gimbal toolface angle.

3. The method of claim 2, further comprising;
rotating, with the angular positioning device, the gimbal body to a second gimbal toolface angle.

4. The method of claim 2, wherein the reference frame is selected from a terrestrial reference frame or inertial reference frame.

5. The method of claim 4, wherein the reference frame is a terrestrial reference frame, and the terrestrial reference frame is defined with respect to a gravity vector, magnetic field vector, or Earth rotation vector.

6. The method of claim 2, further comprising:
taking a measurement with one or more sensors coupled to the gimbal body.

7. The method of claim 6, wherein the one or more sensors comprise one or more of accelerometers, magnetometers, or gyros.

8. The method of claim 6, further comprising:
rotating, with the angular positioning device, the gimbal body to a second gimbal toolface angle; and
taking an additional measurement with the one or more sensors coupled to the gimbal body.

9. The method of claim 6, wherein the gimbal toolface angle is determined by the measurement of the one or more sensors.

10. The method of claim 2, further comprising:
determining a reference position corresponding to a preselected gimbal toolface angle; and
rotating, with the angular positioning device, the gimbal body to the reference position such that the determined gimbal toolface angle is the preselected gimbal toolface angle.

11. The method of claim 6, wherein the one or more sensors include one or more accelerometers coupled to the gimbal body, and the method further comprises:
taking a first measurement with an accelerometer; and
determining an azimuth or inclination of the tool body.

12. The method of claim 11, further comprising:
rotating, with the angular positioning device, the gimbal body to a second gimbal toolface angle;
taking a second measurement with the accelerometer; and
comparing the first and second measurements to identify accelerometer error or bias.

13. The method of claim 6, wherein the one or more sensors include one or more magnetometers coupled to the gimbal body, and the method further comprises:
taking a first measurement with a magnetometer; and
determining an azimuth or inclination of the tool body.

14. The method of claim 13, further comprising:
rotating, with the angular positioning device, the gimbal body to a second gimbal toolface angle;
taking a second measurement with the magnetometer; and
comparing the first and second measurements to identify magnetometer error or bias.

15. A method comprising:
providing a steering tool on a drill string, the steering tool including:
a tool body;
a gimbal body, the gimbal body rotatably coupled to the tool body;
an angular positioning device, the angular positioning device coupled to the gimbal body to rotate the gimbal body relative to the tool body about a gimbal body axis of rotation; and
a sensor coupled to the gimbal body;
positioning the steering tool and drill string in a wellbore, the steering tool steering the drill string;
determining a reference frame; and
determining a gimbal toolface angle with respect to the reference frame with the sensor.

16. The method of claim 15, further comprising:
determining a reference position corresponding to a preselected gimbal toolface angle; and
rotating, with the angular positioning device, the gimbal body to the reference position such that the determined gimbal toolface angle is the preselected gimbal toolface angle.

17. The method of claim 16, further comprising:
measuring a change in angular rate of rotation of the gimbal body with a gyro coupled to the gimbal body having a sensitive axis substantially aligned with the gimbal body axis of rotation to determine a rotation of the gimbal body; and
rotating the gimbal body with the angular positioning device to oppose the measured change in angular rate of rotation of the gimbal body.

18. The method of claim 16, further comprising;
rotating, with the angular positioning device, the gimbal body to a second gimbal toolface angle.

19. The method of claim 15, wherein the reference frame is selected from a terrestrial reference frame or inertial reference frame.

20. The method of claim 19, wherein the reference frame is a terrestrial reference frame, and the terrestrial reference frame is defined with respect to a gravity vector, magnetic field vector, or Earth rotation vector.

21. The method of claim 15, further comprising:
taking a measurement with the sensor.

22. The method of claim 21, wherein the sensor is an accelerometer, magnetometer, or gyro.

23. The method of claim 22, wherein the sensor is an accelerometer, and the reference position is selected such that the accelerometer senses zero acceleration.

24. The method of claim 23, further comprising a second accelerometer, and the reference position is selected such that the second accelerometer senses a positive or negative acceleration.

25. The method of claim 22, wherein the sensor is a magnetometer, and the reference position is selected such that the magnetometer senses zero magnetic field.

26. The method of claim 25, further comprising a second magnetometer, and the reference position is selected such that the second magnetometer senses a positive or negative magnetic field.

27. The method of claim 21, further comprising:
rotating, with the angular positioning device, the gimbal body to a second gimbal toolface angle; and
taking an additional measurement with the one or more sensors coupled to the gimbal body.

28. The method of claim 27, wherein the second toolface angle is determined with respect to the reference frame with the sensor.

29. The method of claim 21, wherein the sensor includes one or more accelerometers coupled to the gimbal body, and the method further comprises:
   taking a first measurement with an accelerometer; and
   determining an azimuth or inclination of the tool body.

30. The method of claim 29, further comprising:
   rotating, with the angular positioning device, the gimbal body to a second gimbal toolface angle;
   taking a second measurement with the accelerometer; and
   comparing the first and second measurements to identify accelerometer error or bias.

31. The method of claim 21, wherein the sensor includes one or more magnetometers coupled to the gimbal body, and the method further comprises:
   taking a first measurement with a magnetometer; and
   determining an azimuth or inclination of the tool body.

32. The method of claim 31, further comprising:
   rotating, with the angular positioning device, the gimbal body to a second gimbal toolface angle;
   taking a second measurement with the magnetometer; and
   comparing the first and second measurements to identify magnetometer error or bias.

33. A method comprising:
   providing a steering tool on a drill string;
   positioning the steering tool and drill string in a wellbore, the steering tool steering the drill string, the steering tool including:
      a tool body;
      a gimbal body, the gimbal body rotatably coupled to the tool body;
      an angular positioning device, the angular positioning device coupled to the gimbal body to rotate the gimbal body relative to the tool body about a gimbal body axis of rotation;
      a gyro coupled to the gimbal body having a sensitive axis substantially aligned with the gimbal body axis of rotation; and
      one or more sensors coupled to the gimbal body;
   preventing rotation between the gimbal body and the tool body;
   taking measurements with the at least one sensor;
   determining that the gimbal body has not rotated during the sensor measurements for a preselected sample period by measuring a change in angular rate of rotation of the gimbal body with the gyro; and
   using the sensor measurements to determine one or more of orientation of the steering tool or error, bias, or mass unbalance of the sensor or gyro.

34. The method of claim 33, wherein rotation between the gimbal body and the tool body is prevented by the angular positioning device, a brake, a latch, or combinations thereof.

35. The method of claim 33 further comprising;
   determining a reference frame; and
   determining a gimbal toolface angle with respect to the reference frame.

36. The method of claim 35, further comprising;
   rotating, with the angular positioning device, the gimbal body to a second gimbal toolface angle.

37. The method of claim 35, wherein the reference frame is selected from a terrestrial reference frame or inertial reference frame.

38. The method of claim 37, wherein the reference frame is a terrestrial reference frame, and the terrestrial reference frame is defined with respect to a gravity vector, magnetic field vector, or Earth rotation vector.

39. The method of claim 33, wherein the one or more sensors comprise one or more of accelerometers, magnetometers, or gyros.

40. The method of claim 39, wherein the one or more sensors include one or more accelerometers coupled to the gimbal body, and the method further comprises:
   taking a first measurement with an accelerometer; and
   determining an azimuth or inclination of the tool body.

41. The method of claim 40, further comprising:
   rotating, with the angular positioning device, the gimbal body to a second gimbal toolface angle;
   taking a second measurement with the accelerometer; and
   comparing the first and second measurements to identify accelerometer error or bias.

42. The method of claim 39, wherein the one or more sensors include one or more magnetometers coupled to the gimbal body, and the method further comprises:
   taking a first measurement with a magnetometer; and
   determining an azimuth or inclination of the tool body.

43. The method of claim 40, further comprising:
   rotating, with the angular positioning device, the gimbal body to a second gimbal toolface angle;
   taking a second measurement with the magnetometer; and
   comparing the first and second measurements to identify magnetometer error or bias.

44. A method comprising:
   providing a steering tool on a drill string;
   positioning the steering tool and drill string in a wellbore, the steering tool steering the drill string, the steering tool including:
      a tool body;
      a gimbal body, the gimbal body rotatably coupled to the tool body;
      an angular positioning device, the angular positioning device coupled to the gimbal body to rotate the gimbal body relative to the tool body about a gimbal body axis of rotation; and
      a sensor coupled to the gimbal body;
   determining a reference frame;
   taking a first measurement with the sensor;
   determining a gimbal toolface angle with respect to the reference frame with the sensor;
   rotating, with the angular positioning device, the gimbal body to a second gimbal toolface angle;
   taking a second measurement with the sensor; and
   comparing the first and second measurements to identify sensor error or bias.

45. The method of claim 44, wherein the sensor is an accelerometer.

46. The method of claim 44, wherein the sensor is a magnetometer.

47. The method of claim 44, further comprising determining an azimuth or inclination of the tool body using the first or second measurement.

* * * * *